(12) United States Patent
Di Cocco et al.

(10) Patent No.: US 9,158,852 B2
(45) Date of Patent: Oct. 13, 2015

(54) GEOGRAPHICAL AREA CORRELATED WEBSITES

(71) Applicant: International Businesss Machines Corporation, Armonk, NY (US)

(72) Inventors: Antonio Di Cocco, Rome (IT); Leonardo Lanni, Rome (IT); Gianluca Perreca, Rome (IT); Andrea Tortosa, Rome (IT)

(73) Assignee: International Business Machines Corporation, Armonk, NY (US)

( * ) Notice: Subject to any disclaimer, the term of this patent is extended or adjusted under 35 U.S.C. 154(b) by 421 days.

(21) Appl. No.: 13/721,137

(22) Filed: Dec. 20, 2012

(65) Prior Publication Data

US 2014/0181064 A1 Jun. 26, 2014

(51) Int. Cl.
*G06F 7/00* (2006.01)
*G06F 17/30* (2006.01)

(52) U.S. Cl.
CPC .................................. *G06F 17/3087* (2013.01)

(58) Field of Classification Search
None
See application file for complete search history.

(56) References Cited

U.S. PATENT DOCUMENTS

| 4,873,513 | A | * | 10/1989 | Soults et al. ..................... 345/27 |
|---|---|---|---|---|
| 7,231,405 | B2 | | 6/2007 | Xia |
| 8,050,689 | B2 | | 11/2011 | Riise et al. |
| 8,132,096 | B1 | * | 3/2012 | Widdowson et al. ......... 715/243 |
| 8,176,082 | B2 | | 5/2012 | Xia |
| 2006/0022978 | A1 | * | 2/2006 | Hoff .............................. 345/427 |
| 2010/0114854 | A1 | | 5/2010 | Lee |
| 2011/0213515 | A1 | * | 9/2011 | Haymart et al. ................ 701/21 |

OTHER PUBLICATIONS

"Geo URI." Wikipedia—the free encyclopedia, version dated Nov. 15, 2011, date printed Sep. 22, 2012 <http://en.wikipedia.org/w/index.php?title=Geo_URI&oldid=460742281>, 2 pages.
"GeoURL (2.0)," dated printed Dec. 10, 2012 <http://www.geourl.org/>, 1 page.
"Village of Endicott New York—Home Page, " date printed Oct. 9, 2012 <http://www.endicottny.com/>, 4 Pages.

* cited by examiner

*Primary Examiner* — Uyen Le

(74) *Attorney, Agent, or Firm* — David B. Woycechowsky

(57) ABSTRACT

A system, method and/or software for using overlap between a first website area-of-interest map, associated with a first website, and a searcher area-of-interest map to help prioritize the websites returned by a search engine search. The area-of-interest maps are made up of geographic pixels respectively assigned with area-of-interest values. Overlap area is determined by comparing, on a pixel-by-pixel basis, corresponding pixels of the searcher area-of-interest map and the first website area-of-interest map to determine overlap pixels where the following conditions hold: (i) the first website area-of-interest map has a non-zero interest value, and (ii) the searcher area-of-interest map has a non-zero interest value.

20 Claims, 8 Drawing Sheets

GEOGRAPHICAL AREA CORRELATED WEBSITES

FIELD OF THE INVENTION

The present invention relates generally to the field of websites communicated over data communication networks (such as the Internet) and more particularly to websites that implicate geographical information.

BACKGROUND OF THE INVENTION

Websites (sometimes herein called web pages) are known. A website is a set of associated data that is typically written in a language, such that hypertext markup language (HTML) or the extensible markup language (XML). It is known that a website may be related to a geographic location. For example, the website www.endicottny.com relates to the village of Endicott, N.Y., USA, because the content of this website (such as its text and pictures) substantively relates to this particular village in the state of New York.

Search engines for finding websites of interest are known. Search engines are applications, which typically reside on servers. Search engines are one means to sift through data in the hundreds of millions of web pages available. Search engines utilize matching algorithms to identify and return a set of "returned websites" (or "hit list") that the search engine has determined to be likely to be of interest to the searcher based on the searcher's search. The matching algorithms may parse alphanumeric text to determine a match between the data interested by the client (herein called the "searcher") and the data accessible to the search engine server hardware and software. The searcher intrinsically defines broadness of the search performed by the server by providing text-based queries designed to be broad, narrow or in between. For example, a search for "villages" would be broader than a search for "Endicott."

Geo URIs are known. A "geo URI" is a Uniform Resource Identifier (URI) for geographic locations using the 'geo' scheme name. A geo URI identifies a physical location in a two- or three-dimensional coordinate reference system in a compact, simple, human-readable way. Geo URIs are also typically not protocol-specific. For example, a specific revision of the vCard specification supports geo URIs in a vCard "GEO" property field. As a further example, the GeoSMS standard uses geo URIs for geotagging SMS (Short Message Service) messages.

There is a currently-existing website called http://geourl.org. This website appears to relate to ICBM (Intercontinental Ballistic Missile) addresses, and should not be confused with the Geo URI background art identified above.

SUMMARY

A method according to the present invention includes a receiving step and a determining step. The receiving step includes receiving: (i) a first website area-of-interest map, associated with a first website data set, the first website area-of-interest map being made up of geographic pixels respectively assigned with area-of-interest values, and (ii) a searcher area-of-interest map, based upon a searcher area of interest defined by a searcher, the searcher area-of-interest map being made up of geographic pixels respectively assigned with area-of-interest values. The determining step includes determining overlap area by comparing, on a pixel-by-pixel basis, corresponding pixels of the searcher area-of-interest map and the first website area-of-interest map to determine overlap pixels where the following conditions hold: (i) the first website area-of-interest map has a non-zero interest value, and (ii) the searcher area-of-interest map has a non-zero interest value. At least the determining step is performed by computer software running on computer hardware.

BRIEF DESCRIPTION OF THE SEVERAL VIEWS OF THE DRAWINGS

FIG. 6A is a diagram view showing operations performed by the first embodiment of the computer system.

FIG. 6B is a diagram view showing operations performed by the first embodiment of the computer system.

FIG. 6C is a diagram view showing operations performed by the first embodiment of the computer system;

FIG. 6D is a diagram view showing operations performed by a second embodiment of a computer system according to the present invention;

FIG. 6E is a diagram view showing operations performed by the second embodiment of the computer system;

FIG. 6F is a diagram view showing operations performed by the second embodiment of the computer system;

DETAILED DESCRIPTION

Figure 1:
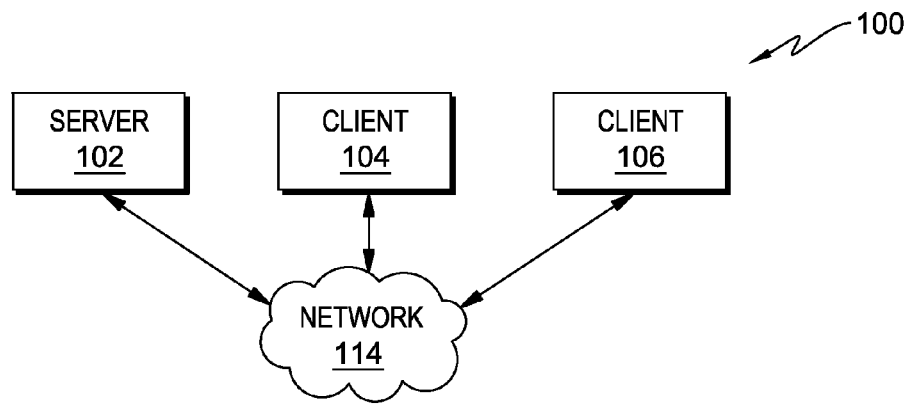
FIG. 1 is a schematic view of a first embodiment of a computer system according to the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures. FIGS. 1, 2A, 2B, 2C and 3 are each a functional block diagram illustrating various portions of distributed data processing system 100, including: server computer sub-system 102; first client (or website (w/s)) developer computer sub-system 104; second client (or searcher) computer sub-system 106; network 114; server computer 200; website developer computer 250; searcher computer 280; communication units 202, 252, 281; processor sets 204, 254, 282; input/output (i/o) interface modules 206, 256, 283; memory devices 208, 258, 286; random access memory devices 230, 270, 287; cache memory devices 232, 272, 288; persistent storage devices 210, 260, 290; search engine software (s/w) 240; overlap module (or "mod") 242; browser 275; w/s software 276; bitmap (or map) mod 277; browser 289; display devices 212, 262, 284; external devices sets 214, 264, 285; fetch searcher area of interest (AOI) sub-mod 302; fetch w/s result AOI sub-mod 304; return ranked results sub-mod 310; calculate overlap (o/l) sub-mod 306; interface sub-sub-mod 318; apply "and" function sub-sub-mod 320; populate o/l bitmap sub-sub-mod 322; and rank result sub-mod 308.

Figure 2A:
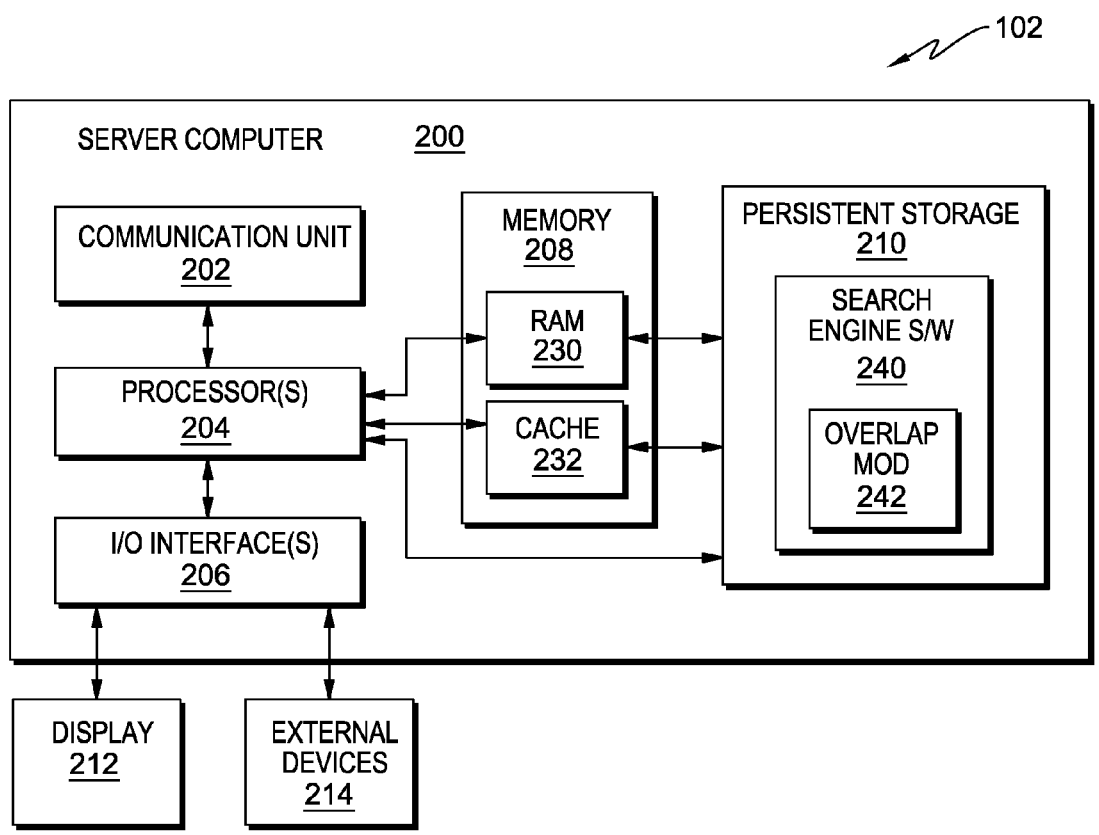
FIG. 2A is a schematic view of a server computer sub-system portion of the first embodiment of the computer system.

As shown in FIG. 2A, server sub-system 102 is a computer used as search engine server hardware and software. Server computer sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. As shown in FIG. 2A, overlap module 242 is a collection of machine readable instructions and data that is used to calculate the amount of overlap between an area of interest (AOI) of a searcher and an area of interest designated for a given website. AOIs correspond generally to areas designated as "bits" on a "bitmap." However, as will be discussed below in connection with FIGS. 6D to 6F, the "bits" may take the form of scalar quantities, rather than 1's and 0's. Also, as discussed below in connection with FIGS. 6G to 6I, the pixilated maps (called AOI maps) may be formed of "pixels" that are irregular in shape, size, layout and/or coordinate axes. The AOI maps will generally be two-dimensional, but this is not necessarily required. In this embodiment, search engine software 240 includes o/l mod 242, and further includes conventional text-based search engine software.

Figure 2B:
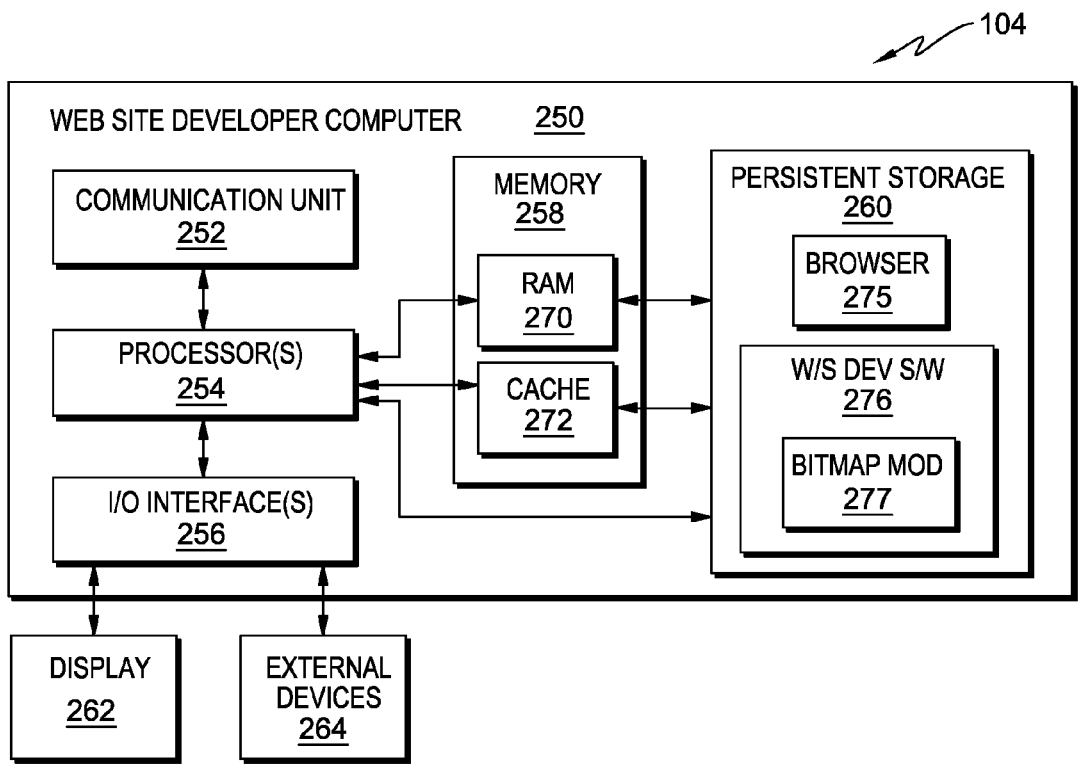
FIG. 2B is a schematic view of a website developer computer sub-system portion of the first embodiment of the computer system.

As shown in FIG. 2B, client sub-system 104 is a computer used by a website developer for creating websites that are designed to be used in the present invention. Client computer sub-system 104 may be a laptop computer, tablet computer, netbook computer, personal computer (PC), a desktop computer, a personal digital assistant (PDA), a smart phone, or any programmable electronic device capable of communicating with the server and other client sub-systems via network 114. Website development software 276, stored in persistent storage of website developer computer 250, may take the form of conventional website development software tools, frameworks and the like. However, bitmap mod (or, simply, map mod) 277 is not conventional. Map mod 277 allows the developer to define an AOI and to associate that AOI with the website under development by the website developer. In some embodiments, the website developer may enter multiple AOIs for a single website. For example: (i) different AOIs could be entered to reflect an area of intense interest and an area of moderate interest; (ii) different AOIs could be entered to be selectively used depending upon where the searcher is located; and/or (iii) different AOIs could be entered to be selectively used depending on other characteristics of future searches and/or searchers. In some preferred embodiments of the present invention, the website under development will be assigned only a single AOI by map mod 277.

Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

It should be appreciated that FIGS. 1, 2A, 2B, 2C and 3, taken together, provide only an illustration of one implementation (that is, system 100) and does not imply any limitations with regard to the environments in which different embodiments may be implemented. Many modifications to the depicted environment may be made, especially with respect to current and anticipated future advances in cloud computing, distributed computing, smaller computing devices, network communications and the like.

Figure 2C:
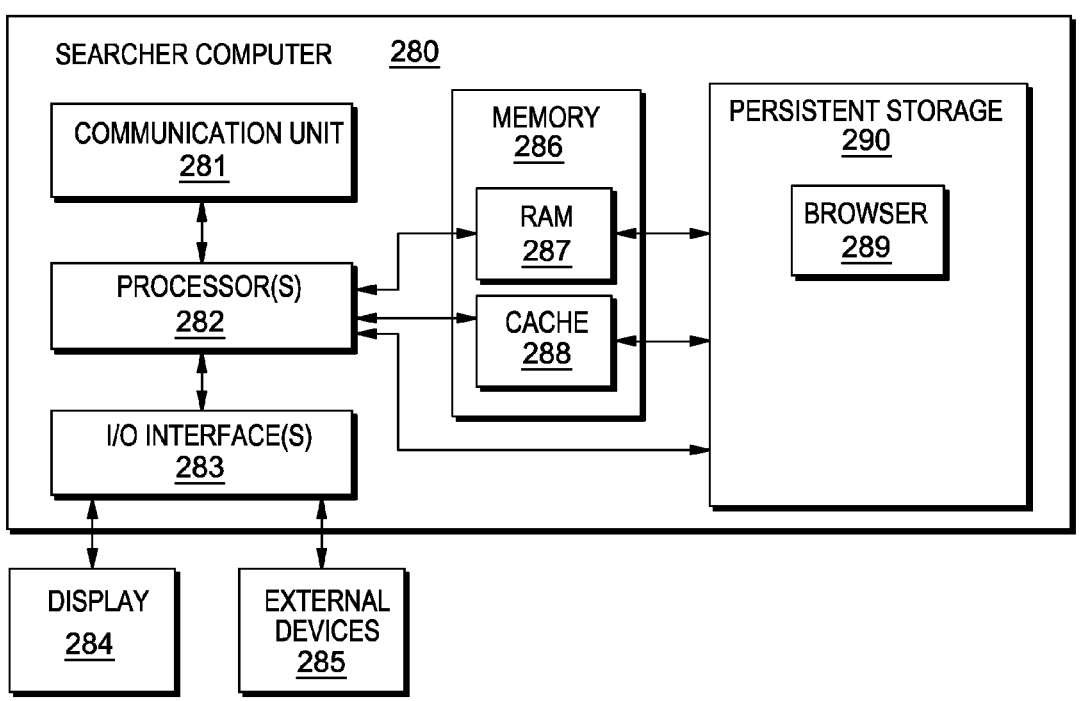
FIG. 2C is a schematic view of a searcher computer sub-system portion of the first embodiment of the computer system.

The computer sub-systems of FIGS. 2A, 2B and 2C are shown as block diagrams with many double arrows. These double arrows (no separate reference numerals) represent a communications fabric, which provides communications between various components of sub-system 102 as shown in FIG. 2A. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Turning again to FIG. 2A, memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Turning again to FIGS. 2A, 2B, and 2C, the respective persistent storage devices 210, 260, 290 store machine readable instructions, and/or data for access and/or execution by one or more of the respective computer processors, usually through one or more memories. Persistent storage devices 210, 260, 290 are at least more persistent than a signal in transit is, but the persistent storage may, of course, be substantially less persistent than permanent storage. For example, persistent storage 210 may or can include a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Staying with FIG. 2A, communication unit 202 provides for communications with other data processing systems or devices external to sub-system 102, such as client sub-systems 104 and 106. Communication unit 202 may include one or more network interface cards. Communication unit 202 may provide communications through the use of either or both physical and wireless communications links. Any software modules discussed herein may be downloaded to a persistent storage device (such as persistent storage device 210) through a communication unit (such as communication unit 202).

Again using the sub-system of FIG. 2A as a representative example, I/O interface 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, search engine s/w 240 and its o/l mod 242, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Turning now to FIG. 2C and using sub-system 106 as a representative example, display device 284 provides a mechanism to display data to a searcher (or other user) and may be, for example, a computer monitor, a smart phone display screen or any other visual display device now known or to be developed in the future.

The programs described herein are identified based upon the application for which these are implemented in a specific embodiment of the invention. However, it should be appreciated that any particular program nomenclature herein is used merely for convenience, and thus the invention should not be limited to use solely in any specific application identified and/or implied by such nomenclature.

Figure 3:
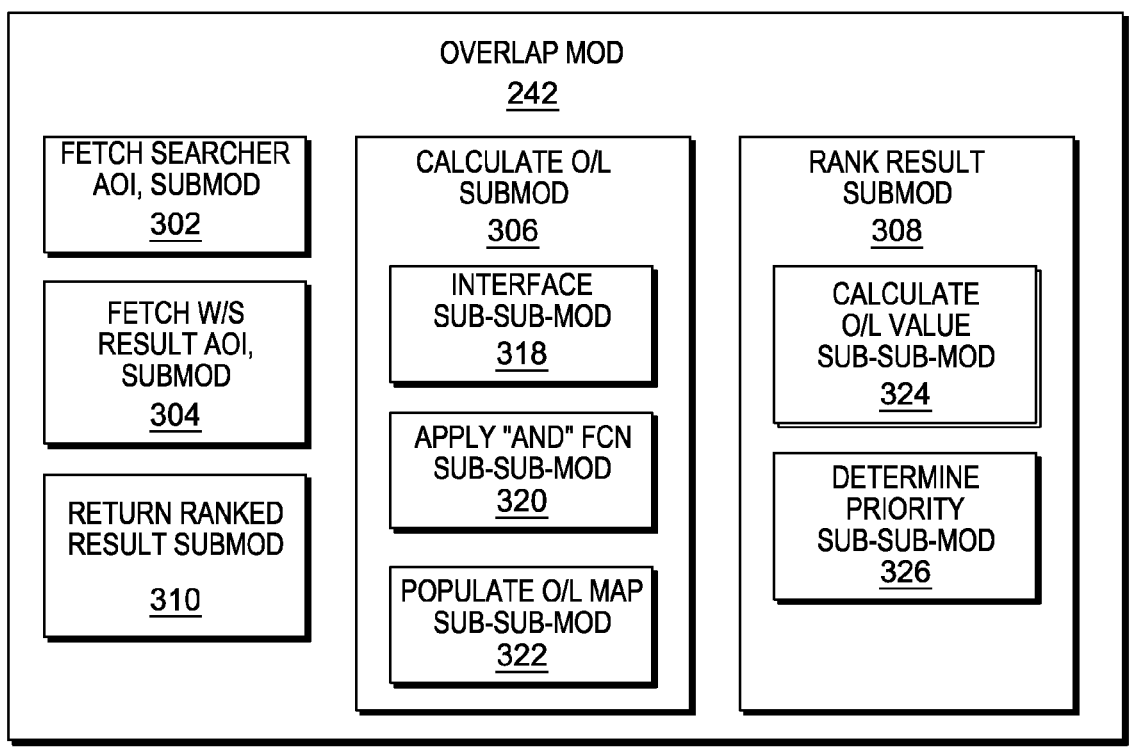
FIG. 3 is a schematic view of a overlap module portion of the first embodiment of the computer system.

Turning now to FIG. 3, detailed discussion of the various modules, sub-modules and/or sub-sub-modules of FIG. 3 are described below with respect to the flow charts of FIGS. 4A and 4B. Generally speaking, the various modules of FIG. 3 compare a searcher's AOI and an AOI associated with one or more websites in order to: (i) determine the overlap between the respective AOIs (this overlap area is sometimes herein called an overlap AOI); and/or (ii) provide or refine a priority order of a hit list based, at least in part, upon the degree and/or nature of the determined overlap AOI.

Some embodiments of the present invention use pixelized maps that represent geographical areas (for example, Italy, the whole world). These will be generically referred to herein as "AOI maps." As mentioned above, a bitmap is one specific type of AOI map. A bitmap in the form of an orthogonal grid with square pixels is a preferred type of AOI map, although it is not the only possible type. Systems and methods, according to the present invention, and using these AOI maps, should preferably be designed to do AOI-map-related calculations sufficiently quickly so that results from a search engine are returned to a searcher substantially as quickly as results from a currently-conventional search engine. For example, if the calculations take several hours then this may be considered as an impractical embodiment for many, if not all, realistic implementations of the present invention. This is the reason that methods according to the present invention generally require the use of one or more computers.

Figure 4A:
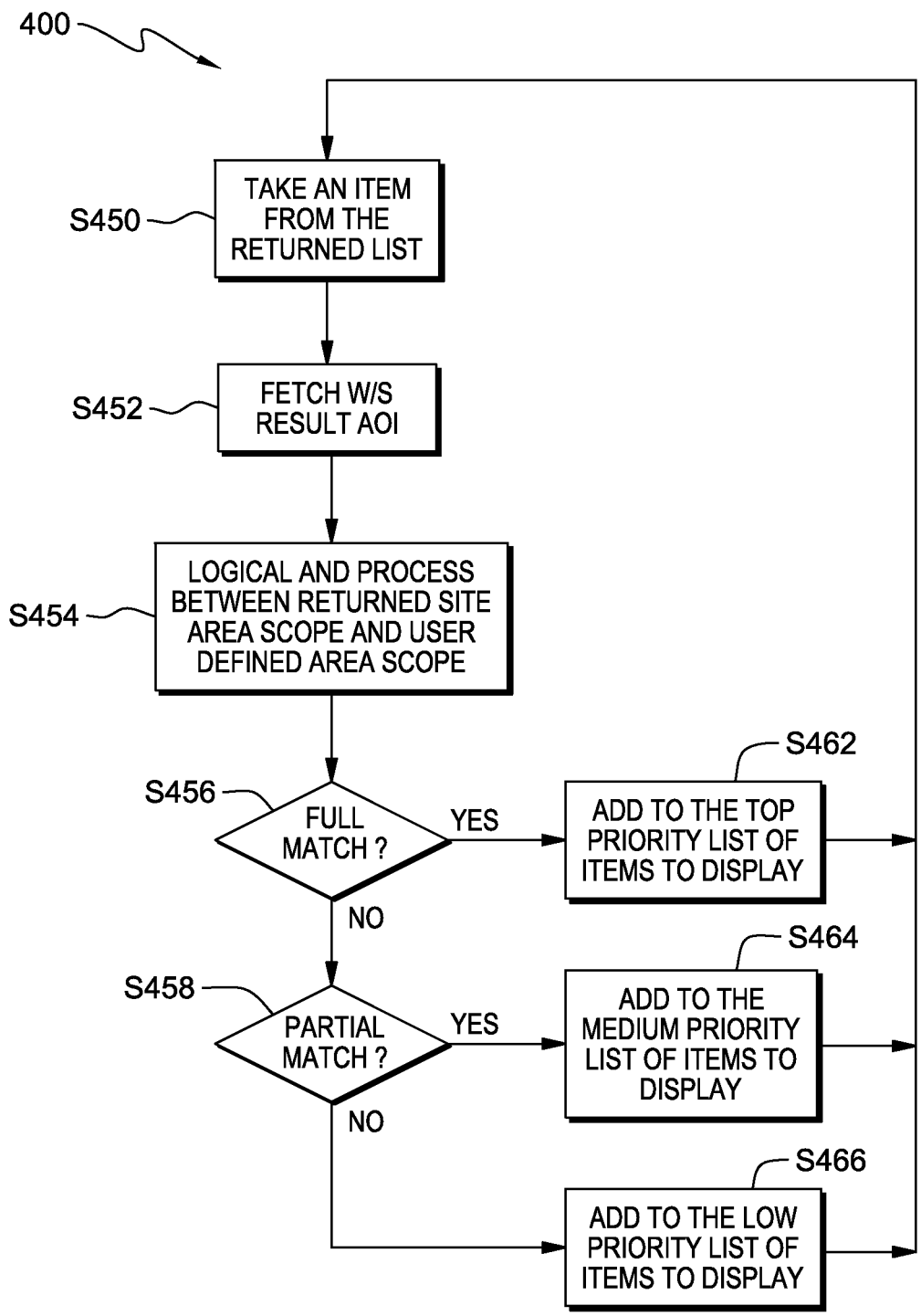
FIG. 4A is a flowchart showing a first process according to the present invention.
Figure 4B:
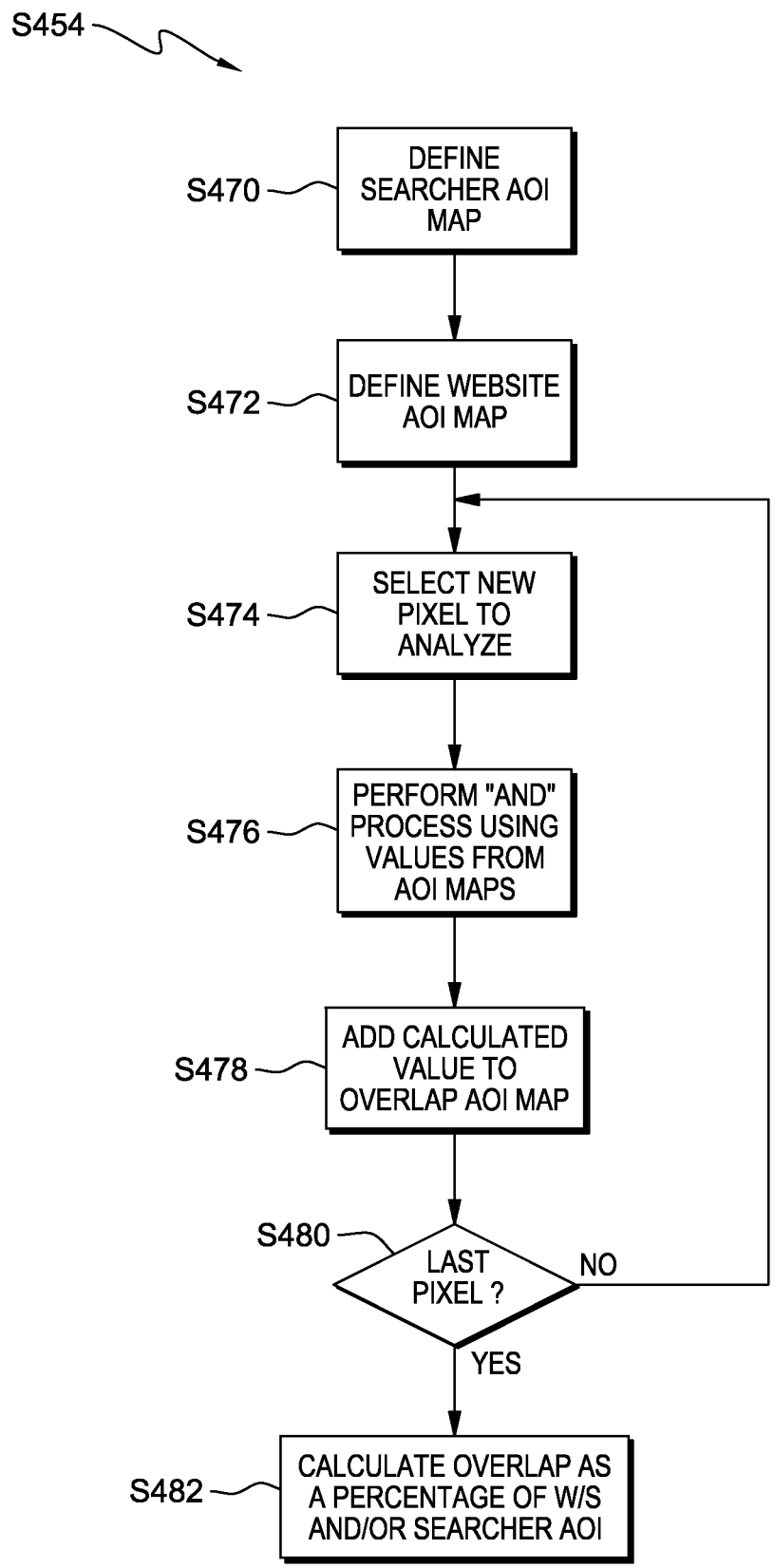
FIG. 4B is a flowchart showing a second process according to the present invention.

Turning now to FIGS. 4A and 4B, FIG. 4A shows a flowchart depicting process 400 in accordance with an embodiment of the present invention. The various steps of process 400 will now be discussed in turn. FIG. 4B shows process 454, which corresponds to step S454 of process 400.

Before step S450 of process 400, a searcher enters a search into a search engine screen. An example, of such a search engine screen is shown at screenshot 500a of FIG. 5A, which includes: search engine window 502; search text entry field 504; search button 506; geolocalization activation field 508; and geolocalization map 509a. Generally, speaking, screenshot 500a is determined by search engine software 240 (see FIG. 2A) working cooperatively in conjunction with searcher's browser 289 (see FIG. 2C). The search engine window and search button are conventional and should be familiar to those of skill in the art. On the other hand, fetch searcher AOI sub-mod 302 of overlap mod 242 of search engine software 240 (see FIGS. 2A and 3) generates and controls geolocalization activation field 508 and geolocalization map 509a. The functionality of field 508 and map 509a will be discussed more fully below.

Also, before the first step S450 of process 400, the searcher will "hit" the search button (see FIG. 5A), which will cause search engine software 240 to determine a preliminary result list (or preliminary "hit" list), although this preliminary hit list is preferably only used for purposes internal to the search engine software and not returned to the user. In this example, the preliminary hit list includes websites that are believed to relate to the search text that the searcher has entered in the search text entry field before hitting the search button (see FIG. 5A at reference numeral 504, where the example text is "commerce law"). This preliminary hit list will usually have a preliminary priority order associated with it, which preliminary priority order would rank the results in the hit list based on expected level of interest for the searcher (and perhaps other factors, such as payment for placement). A conventional search engine, and as will be recognized by those of skill in the art, would simply return this preliminary hit list in its preliminary priority order, to the searcher's display device through the searcher's browser, as the final hit list. However, as will be explained below in detail, the present invention may change the identity and/or the priority order of the returned websites of this preliminary hit list in certain ways, based upon AOI map comparisons, in order to determine and display a final hit list in final priority order.

Besides the searcher's AOI, as mentioned above and to be discussed in detail below, process 400 generally requires at least some of the websites returned in the preliminary hit list will have an associated website AOI. These website AOIs should preferably either be, or be susceptible to being, translated into an AOI map. If none of the preliminary hit list websites have associated AOIs, then process 400 does not apply and, presumably, the preliminary hit list becomes the final hit list, as is currently conventional. On the other hand, if some, or all, of the preliminary hit list websites have a website AOI, the respective comparisons of the searcher's AOI map to the websites' respective AOI maps will generally cause the priority order of the preliminary list to change into a differently ordered final hit list according to the present invention. The AOI map comparison may also cause some website preliminary return results to be dropped from the final hit list.

Turning again to FIG. 4A, at step S450, an item (called the "website under analysis") from the preliminary hit list results is identified for the overlap analysis of process 400. Step S450 is performed by fetch website results AOI sub-module 304 of overlap module 242 of search engine software 240 of server computer 200 of server sub-system 102 (see FIGS. 2A and 3). In at least some embodiments, step S450 and process 400, taken as a whole, will be repeated for each and every website in the preliminary hit list.

At step S452, the following are determined: (i) whether the website under analysis (that is, one of the preliminary hit list websites) has a specified, associated website AOI; and (ii) the AOI map for the website-under-analysis (assuming the website-under-analysis has an associated website AOI). This processing of step S452 is performed by fetch website results AOI sub-module 304 of overlap mod 242 of search engine software 240 of server sub-system 102 (see FIGS. 2A and 3). FIG. 6B shows a (highly simplified) website area of interest map diagram 610 associated with a given website-under-analysis as identified at step S450.

In this simple example, the website AOI map for this website AOI has six total pixels. The website AOI, as designated by the website developer when the website was developed or last edited, corresponds to the three pixels set to have a bit value of "1" (or equivalent) in diagram 610. These six pixels represent six relatively small geographical areas. In more realistic examples there will generally be many, many more pixels. In this simple example, the website AOI is initially provided to sub-module 304 in the form of a website AOI map, but in other examples and as discussed below, sub-mod 304 may need to generate a website AOI map for a website AOI that is presented in a form other than a pixelated map.

As mentioned earlier, there may be websites from the list that do not contain website AOIs. These will generally be tagged and/or prioritized differently than websites that include associated website AOIs. In some embodiments, websites without a specified AOI (no-AOI websites) may be omitted completely from the final hit list. In some embodiments, these no-AOI websites may be placed in a separate hit list from the websites that do specify an AOI. In other embodiments, no-AOI websites may be intermingled with AOI websites in the final hit lists. In these intermingled embodiments, the fact that a website is a no-AOI website may negatively impact its priority in the priority-ordered final hit list.

During the development of the website the website developer may designate the website AOI in many different ways, and the website AOI may be stored for public and/or search engine access in many different ways. As a simple example, the website developer could enter bit values directly on a bitmap which is diagrammatically displayed on the website developer's display device. In most practical embodiments, this method would be tedious and time-consuming for the website developer, but it is a method that would certainly work to make the highly simplified example website AOI map 610 of FIG. 6B. With this method of website AOI entry, entering the website AOI and entering the AOI pixilated map amount to the same thing. However, in some embodiments, the website developer enters a website AOI in a manner other than filling in pixel values on a pixel-by-pixel basis. In these embodiments, it should be understood that the website developer will still enter an AOI, but there will not be a "website AOI map" unless and until the website AOI is somehow translated into the form of a pixilated map where each pixel is assigned an "area of interest value." In embodiments where a website developer enters the website AOI in some manner other than direct assignment of pixel values, the website AOI may be translated to a website AOI map (generally by appropriate software algorithms) at various times including the following: (i) immediately after the developer enters the website AOI; (ii) when the website is stored on server(s) in a searcher-accessible form; (iii) when the website is returned on a preliminary hit list; and/or (iv) at the time step S452 is performed. This translation from website AOI to website AOI map may be performed, for example, by map mod 277 (see FIG. 2B) or overlap mod 242 (see FIG. 2A).

In a preferred embodiment of the present invention, the website developer using map mod 277 (see FIG. 2B) enters the website AOI by defining perimeter points on a map. An example of such perimeter points, and the way that they can be used to define an AOI, is shown at map 509a of FIG. 5A. In this preferred embodiment, this AOI is then translated into a markup language, such as hypertext markup language (HTML) or extensible markup language (XML). The following is HTML-like code for a typical website AOI designation:
<area_tag value=latitude,longitude> optional descriptive label 1 </area_tag>
<area_tag value=latitude,longitude> optional descriptive label 2 </area_tag>
<area_tag value=latitude,longitude> optional descriptive label 3 </area_tag>
(and so on and so forth)
<area_tag value=latitude,longitude> optional descriptive label n </area_tag>

In the above example, the HTML-like syntax is a website AOI that contains geographical data in the form of latitude and longitude. The above area_tags may contain other information, such as geographical data that describes altitude, information that describes an area underwater, or information within the earth, such as an underground mine location. In the above instance, the latitude and longitude are vertices for construction of an arbitrary polygon which is the website AOI. In this example, map mod 277 (see FIG. 2B) builds the HTML-like syntax such that area_tags are ordered clockwise, if that is the prevailing convention; otherwise, it could be counterclockwise, clockwise in the north-hemisphere, and counterclockwise in the southern-hemisphere, or any prevailing browser convention. Website development software may provide other useful functions; one such function is to generate error messages when HTML conventions are broken. Other functions may include: (i) displaying the AOI in 2D or 3D; (ii) geographical zooming; (iii) overlaying multiple AOIs, on a map, pulled from website child pages; (iv) overlaying an AOI with natural or man-made objects, such as a tree or building; and/or (v) how the AOI moves along in time with plate tectonics. In this example, the website AOI (in HTML form that includes latitude/longitude data) is translated into an appropriate website AOI map at step S452.

After completion of step S452, processing proceeds to step S454. In this step, the searcher's AOI map is compared, on a pixel-by-pixel basis, with the website AOI of the website-under-analysis, as will be discussed below. In this embodiment, step S454 is performed by overlap module 242 of search engine software 240 as shown in FIG. 2A. One example of the result of such a comparison is the overlap map diagram 620 of FIG. 6C. Another example of such a comparison is the overlap map diagram 650 of FIG. 6F. Step S454 will now be discussed in detail with extensive reference to FIG. 4B.

Processing begins at sub-step S470 (see FIG. 4B) where the searcher AOI is defined and/or obtained by fetch searcher AOI sub-mod 302 (see FIG. 3). It is noted that this AOI map comparison of the present invention is taking place because the searcher has activated the geolocalize feature (see FIG. 5A at reference numeral 508). This means that at sub-step S470: (i) the searcher should provide an AOI; and (ii) the searcher AOI should be converted into a searcher AOI map. In this example, the searcher indicated a searcher AOI by identifying points 510a,b,c,d,e,f,g on a map using an input device (see FIG. 5A at map 509a). These perimeter points are then used to define a perimeter 512 which corresponds to the searcher's AOI. Interface sub-sub-mod 318 of calculate overlap sub-mod 306 of overlap mod 242 of search engine software 240 converts this perimeter into a pixilated AOI map which is herein called a "searcher AOI map." Examples of searcher AOI maps are shown in FIG. 6A and FIG. 6D. Map diagram 600 of FIG. 600A is a searcher AOI in the form of a bitmap. Map diagram 630 is a searcher AOI which is not in the form of a bitmap because its constituent area of interest values are scalar quantities, rather than just one's and zero's.

Figure 6G:
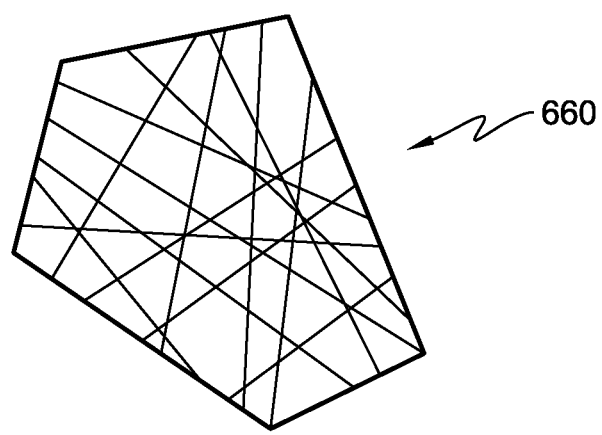
FIG. 6G is a diagram view showing operations performed by a third embodiment of the computer system according to the present invention.
Figure 6H:
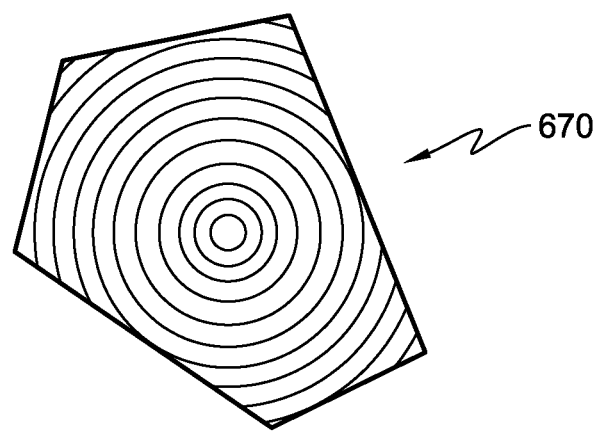
FIG. 6H is a diagram view showing operations performed by a fourth embodiment of the computer system.
Figure 6I:
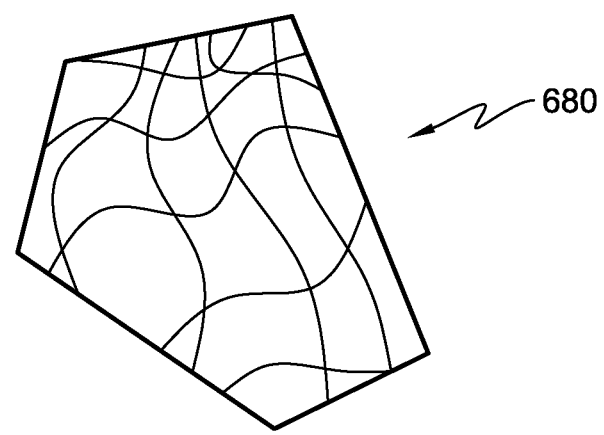
FIG. 6I is a diagram view showing operations performed by a fifth embodiment of the computer system according to the present invention.

Processing proceeds to sub-step S472 where a website AOI map is defined or obtained. If the website AOI has not previously been put into the form of an AOI map, then this conversion is done in order to complete sub-step S472. The present invention generally requires that the pixels of the searcher AOI map correspond (in size, shape, geographical area) to the pixels of the website AOI map at least closely enough so that a meaningful pixel-by-pixel comparison between these AOI maps may be performed. This means that at sub-steps S470 and S472, it should be ensured that the pixels of the respective AOI maps correspond closely enough to each other. For example: (i) FIG. 6G shows AOI map 660; (ii) FIG. 6H shows AOI map 670; and (iii) FIG. 6I shows AOI map 680. While these three AOI maps represent the same geographical area, the maps are pixilated with pixels of different sizes and/or shapes. If the searcher AOI was in one of these AOI pixilation formats and the website AOI was in another AOI pixilation format, then one or both maps would need to be converted so there is a common format and the searcher and website AOI maps can be compared to each other. In some preferred embodiments, the search engine will ensure that website developers (defining website AOI maps) and searchers use a common pixilation format when defining their respective AOIs.

After sub-step S472, processing proceeds to sub-step S474 where corresponding pixels of the searcher AOI map and the website AOI map are selected for comparison by apply "and" function sub-sub-mod 320. Three examples will now be discussed with reference to FIGS. 6A to 6C: (i) one example where the X(1,1) pixel of searcher AOI map 600 is compared with Y(1,1) pixel of website AOI map 610; (ii) another example where the X(1,2) pixel of searcher AOI map 600 is compared with Y(1,2) pixel of website AOI map 610; and (iii) another example where the X(1,3) pixel of searcher API map 600 is compared with Y(1,3) pixel of website AOI map 610.

Now that the comparison pixels have been selected, processing proceeds to step S476, where sub-sub-mod 320 performs "and" processing.

In the first example the X(1,1) pixel of searcher API map 600 is compared with Y(1,1) pixel of website AOI map 610. In this example, both of the respective area of interest values are zero, which means that the overlap AOI value is zero.

In the second example the X(1,2) pixel of searcher API map 600 is compared with Y(1,2) pixel of website AOI map 610. In this example, both of the respective area of interest values are one, which means that the overlap AOI value is one.

In the third example the X(1,3) pixel of searcher API map 600 is compared with Y(1,3) pixel of website AOI map 610. In this example, one of the AOI values is zero, which means that the overlap AOI value is zero.

Processing proceeds to sub-step S478 wherein the result of the "and" function comparison is written, by populate overlap map sub-mod 322 (see FIG. 3), into the overlap AOI map. As shown in FIG. 6C, for the three specific pixel comparison examples mentioned above, map diagram 620, shown in FIG. 6C, is populated as follows: (i) first example, O(1,1)=0; (ii) second example, O(1,2)=1; and (iii) third example, O(1,3)=0.

At sub-step S480, processing continues looping back to sub-step S474 until all of the respectively corresponding pixels of the searcher AOI map and the website AOI map of the website-under-analysis are compared. When sub-step S480 determines that the last pixel has been reached then: (i) the O(i,j) overlap AOI map will be fully populated; and (ii) processing proceeds to sub-step S482.

At sub-step S482, an overlap value is calculated by calculate overlap value sub-sub-mod 324 of rank result sub-mod 308 of overlap mod 242 (see FIG. 3). This overlap value is generally based upon the overlap as determined at sub-step S476. For example, the overlap value may be the absolute number of overlapping pixels, which would be 1 for o/l AOI map 620 shown in FIG. 6C. Alternatively, it may be the number of overlapping pixels divided by a normalizing factor, such as the number of non-zero pixels in the searcher AOI map and/or the number of non-zero pixels in the website AOI map. Analyzed websites with more overlap will, of course, tend to have higher overlap values. After sub-step S482 is complete, this means that step S454 (see FIG. 4A) is complete, and processing proceeds to step S456.

At step S456, determine priority sub-sub-mod 326 of rank result sub-mod 308 of overlap mod 242 determines whether the overlap value is co-extensive with the searcher AOI and/or the website AOI, which is called a "full match." If there is not a full match then processing proceeds to step S458 to be discussed below.

If there is a "full match" determined at step S456, then processing proceeds to step S462. At step S462, sub-sub-mod 326 refines the priority of the website-under-analysis to reflect the full match. In this example, the full match website is added to the top of the priority list of items to display and processing loops back to step S450 so that another website can be analyzed, and its priority refined.

At step S458, determine priority sub-sub-mod 326 determines whether the overlap value is partially co-extensive with the searcher AOI and/or the website AOI, which is called a "partial match." If there is not a partial match then processing proceeds to step S466 to be discussed below.

If there is a "partial match" determined at step S458, then processing proceeds to step S464. At step S464, sub-sub-mod 326 refines the priority of the website-under-analysis to reflect the partial match. In this example, the partial match website is added to a "medium" priority list of items to display and processing loops back to step S450 so that another website can be analyzed and its priority refined. For example, in the example of FIGS. 6A to 6C, the overlap is approximately 17% (as normalized against the six pixel "universe") or approximately 33% (as normalized against the searcher AOI or the website AOI).

At step 466, sub-sub-mod 326 adds the no-match website to a low priority list. Alternatively, such an item might be removed from the final results hit list all together. After step S466 is performed processing loops back to step S450 so that another website can be analyzed and its priority refined.

After all of the websites from the preliminary hit list are analyzed by process 400, the final hit list and the final priority of the final hit list are fully determined and at least some portion (or portions) of this final hit list will generally be displayed to the user in priority order (or with some other indicia that communicates the priority order).

Figure 5A:
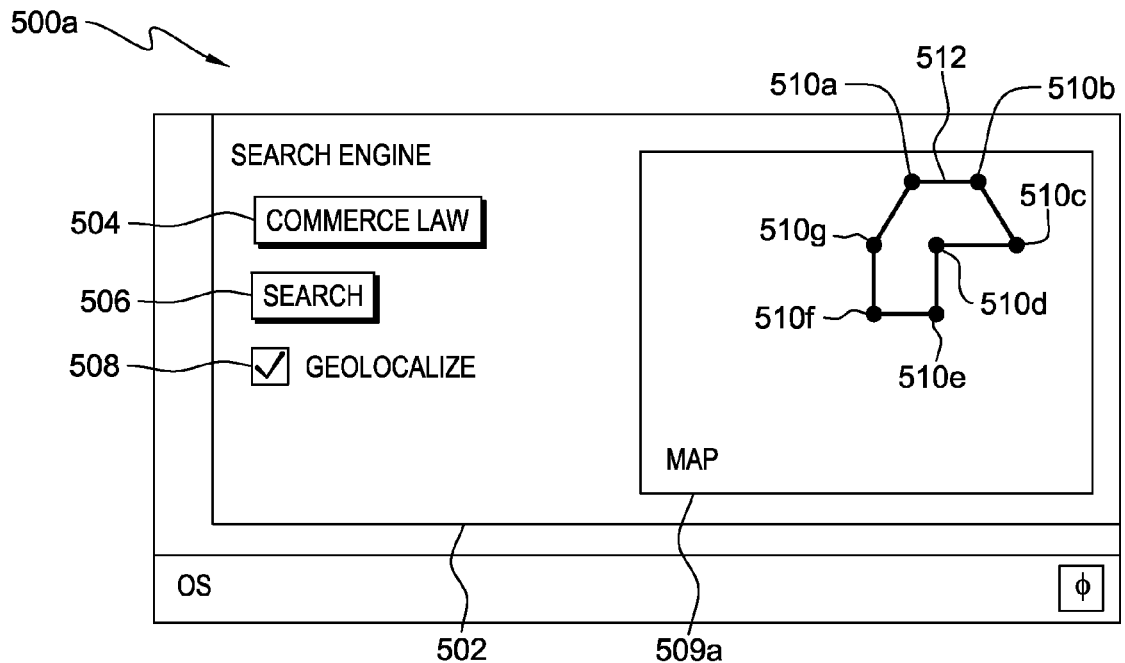
FIG. 5A is a first screenshot view generated by the first embodiment of the computer system.
Figure 5B:
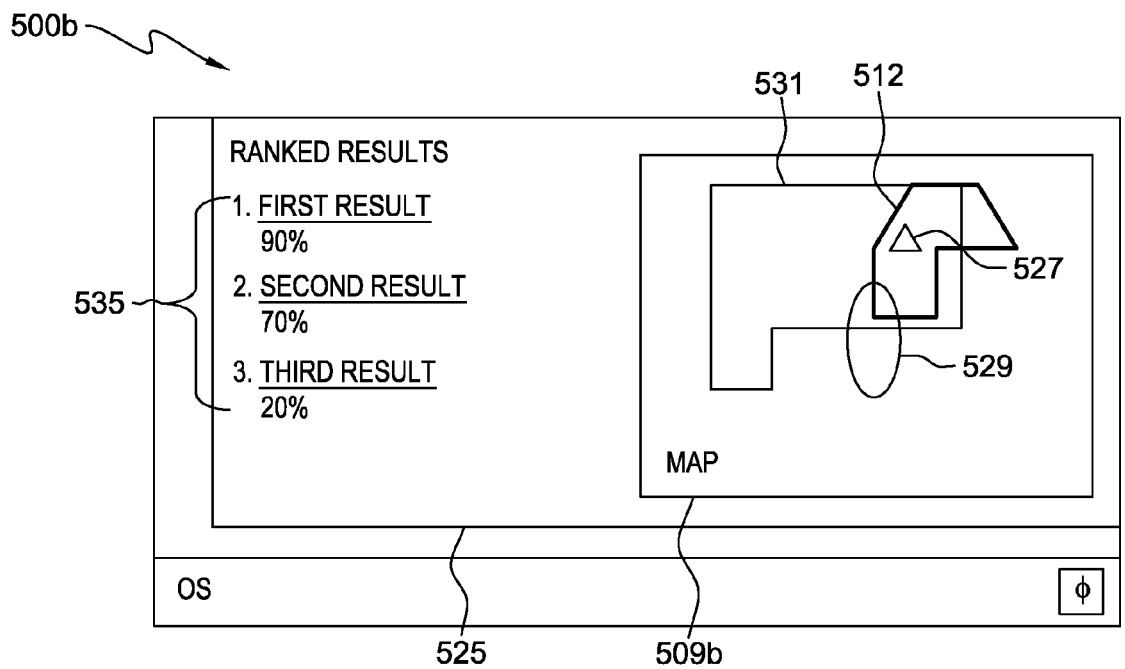
FIG. 5B is a second screenshot view generated by the first embodiment of the computer system.

For example, turning now to FIG. 5B, screenshot 500b includes: search results return window 525. Search results return window includes map 509b and priority-ordered hit list 535. Map 509b includes: searcher AOI perimeter 512; first hit AOI perimeter 527; second hit AOI perimeter 531; third hit AOI perimeter 529; and final hit list portion 535.

In hit list portion 535, the three highest priority website hits have been returned in response to the searcher's search, and also give a numerical approximation of the degree of interest, or relevance, of each respective hit on the final hit list. In this example, all of these three hits equally relate to "commerce law," which is the text the searcher entered in the search bar. However, the three results have three different associated website AOIs 527, 531, 529. Therefore, the final priority order of portion 535 is largely determined by the respective overlap between each respective website AOI and the searcher's AOI. As a first example, the triangular website AOI 527 of the first hit lies entirely within the searcher's AOI 512, and this leads to a priority rating of approximately 90%, which means that the first hit has the highest expected relevance of any hit returned by the search. As a second example, the L-shaped website AOI 531 of the second hit largely subsumes the searcher's AOI 512, and this leads to a priority rating of approximately 70%, which means that the second hit has the second highest expected relevance of any hit returned by the search. As a third example, the elliptical website AOI 529 of the third hit has a relatively small amount of overlap with the searcher's AOI 512, and this leads to a priority rating of approximately 20%, which means that the third hit has the third highest expected relevance of any hit returned by the search.

In the example of the previous paragraph, the fact that the first hit AOI was subsumed by the searcher's AOI led to a priority rating of approximately 90%, rather than 100%. This rating would have been higher, in this embodiment, if the sercher's AOI and the first hit's AOI were substantially co-extensive. However, in other embodiments, this same situation of the searcher's AOI subsuming the first hit's AOI could lead to a priority rating of 100%. It is a matter of design choice when deciding, in a detailed manner, exactly how various types and/or amounts of overlap will be effectively translated into priority ratings.

It is important to note that window 525 is not the only way that a priority-ordered hit list, and/or graphical representation of overlap map be presented to a user. However, this simple example is believed to communicate the larger concept of displaying a final hit list in priority order according to the present invention. As noted above, process 400 describes an alternative process where separate final hit lists are created, based, in part, on the degree of overlap.

It is also important to note that there is no single algorithm for calculating how the degree and nature of overlap will impact priority. As some examples of possible ways that prioritization algorithms can vary: (i) different weight can be given to the geographic overlap analysis as opposed to the conventional text-driven analysis part (if any) of the search; (ii) overlap may be normalized based on the searcher's AOI area; (iii) overlap may be normalized based on the website's respective AOI area; (iv) websites whose AOI subsumes the searcher's AOI may be prioritized differently than websites whose AOI is subsumed by the searcher's AOI; (v) priority may be affected only if the searcher and website AOI are co-extensive, or very close to co-extensive; (vi) degree of overlap could be negatively correlated with priority order impact; and so on.

Some additional information relating to various embodiments of the present invention will now be discussed.

The "and" operation shown in FIGS. 6A to 6C can be set forth in mathematical language as follows:

For each value of i and j, calculate as follows:

$O_{ij} = X_{ij} \wedge Y_{ij}$: where $\wedge$ is the logical conjunction

Checkbox 508, in the example of FIG. 5A, is one possible way for the searcher to indicate that the search engine should perform a search in which geographical data is a consideration. Alternatively, for instance, a drop down box could be used, where the drop down box lists several choices for the searcher, such as: "Full overlap only", "30%-80% overlap only", "0% overlap only", "maximum of 3 geographical data websites", and "only find one geographical data site" (the rest being non-geographical data websites). Furthermore, in the example of FIG. 5A, the searcher has provided the searcher's AOI by adding vertices 510a through 510g, thus forming an arbitrary polygon 512 to be overlaid on a map 509a.

FIGS. 6D through 6F (that is, diagrams 630, 640, 650), demonstrate another possible implementation for determining overlap. Rather than the square pixel value being a "1" or a "0" the pixel values of the AOI maps of diagrams 630, 640, 650 respectively contain a number from 0 to 7. The "0" case representing an area of little expected interest or relevance. The "7" case represents an area of high interest. In this example, an alternative mathematical model determines the overlap value, such that when both the searcher's AOI cell (diagram 630) and the website designer's AOI cell (diagram 640) have non-zero values the average of the two cells is calculated (see diagram 650); otherwise, a "0" is entered 650.

For each value of i and j, calculate as follows:

$O_{ij} = \text{average}(X_{ij}, Y_{ij})$

The embodiment explained above in connection with FIGS. 6D to 6F is not necessarily preferred and poses some challenges of which system designers should be mindful. First, assignment of dedicated values to each and every pixel will generally be difficult if the map has enough pixels to have reasonable geographical area and granularity. Also, if may be possible to allow the website entity to assign non-binary values to pixels, while still only allowing searches to assign binary values. This is true because website designers generally have more time and interest with populating a granulated pixel map with non-binary values. Also, even in the (not necessarily preferred) embodiments with non-binary pixels values, there are many possible ways to account (or choose not to account) for these non-binary weights as will be readily apparent to those of skill in the art. However, even in these embodiments, the concept of determining conjunctive overlap is likely to remain important.

FIGS. 6A through 6F illustrate orthogonal bitmaps to calculate overlap results. Orthogonal bitmaps are not the only possible exemplification. FIGS. 6G through 6I illustrates other means to overlay grid structures that are non-orthogonal. For instance, FIG. 6G 660 contains a grid structure having straight lines that are not orthogonal to one another. Furthermore, FIG. 6H 670 and FIG. 6I 680 both contain curved lines, however in FIG. 6H the curves lines do not intersect, while the curves do intersect in FIG. 6I.

The flowchart and block diagrams in the foregoing Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The following paragraphs provide definitions for certain term(s) used in this document:

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

And/or: non-exclusive or; for example, A and/or B means that: (i) A is true and B is false; or (ii) A is false and B is true; or (iii) A and B are both true.

Searcher: includes, but is not necessarily limited to, the following: (i) a single individual human; (ii) an artificial intelligence entity with sufficient intelligence to act as a searcher; and/or (iii) a group of related searchers.

What is claimed is:

1. A method comprising the following steps:
receiving: (i) a first website area-of-interest map, associated with a first website data set, the first website area-of-interest map being made up of geographic pixels respectively assigned with area-of-interest values, and (ii) a searcher area-of-interest map, based upon a searcher area of interest defined by a searcher, the searcher area-of-interest map being made up of geographic pixels respectively assigned with area-of-interest values; and determining overlap area by comparing, on a pixel-by-pixel basis, corresponding pixels of the searcher area-of-interest map and the first website area-of-interest map to determine overlap pixels where the following conditions hold: (i) the first website area-of-interest map has a non-zero interest value, and (ii) the searcher area-of-interest map has a non-zero interest value;

wherein:
at least the determining step is performed by computer software running on computer hardware.

2. The method of claim 1 further comprising the following steps:
entering, by a website development entity, a first website area of interest associated with the first website data set;
converting the first website area of interest into the first website area-of-interest map; and making the first website data set and its associated first website area of interest available, over a data communication network, to a search engine.

3. The method of claim 2 wherein the converting step is performed subsequent to the making step and prior to the receiving step.

4. The method of claim 3 wherein:
the first website area of interest is represented in an XML format; and
at the converting step, a search engine converts the first website area of interest into the first website area-of-interest map.

5. The method of claim 1 further comprising the step of:
calculating a first overlap value based, at least in part, upon the identity, quantity, area-of-interest values and/or distribution of the overlap pixels as determined at the determining step.

6. The method of claim 5 further comprising the following steps:
entering, as searcher input by a searcher through a search engine, a search query including a searcher area of interest; and
converting, by the search engine, the searcher area of interest into the searcher area-of-interest map.

7. The method of claim 6 further comprising the step of:
collecting, by the search engine, a plurality of responsive website data sets that: (i) includes the first website data set, and (ii) are responsive to the search query; and
prioritizing, by the search engine, the plurality of responsive website data sets, with the prioritization being based, at least in part, upon the first overlap value determined at the calculating step.

8. The method of claim 7 further comprising the step of:
returning, to the searcher, in priority order as determined at the prioritizing step, a hit list including a plurality of search result returns;
wherein:
each search result return identifies and links to one of the responsive web site data sets of the plurality of responsive website data sets; and
the hit list includes a search result return corresponding to the first website data set.

9. A search server computer system, the search server computer system comprising:
a processor set; and
a data storage device;
wherein:
the data storage device stores an overlap module comprising machine readable instructions and associated data;
the processor set is structured, programmed and/or connected to run the overlap module;
the overlap module comprises:
a receiving sub-module programmed to receive: (i) a first website area-of-interest map, associated with a first website data set, the first website area-of-interest map being made up of geographic pixels respectively assigned with area-of-interest values, and (ii) a searcher area-of-interest map, based upon a searcher area of interest defined by a searcher, the searcher area-of-interest map being made up of geographic pixels respectively assigned with area-of-interest values; and
a determining sub-module programmed to determine and overlap area by comparing, on a pixel-by-pixel basis, corresponding pixels of the searcher area-of-interest map and the first website area-of-interest map to determine overlap pixels where the following conditions hold: (i) the first website area-of-interest map has a non-zero interest value, and (ii) the searcher area-of-interest map has a non-zero interest value.

10. The system of claim 9 wherein the overlap module further comprises a converting sub-module programmed to convert a first website area of interest into the first website area-of-interest map.

11. The system of claim 10 wherein the first website area of interest is represented in an XML format.

12. The system of claim 9 wherein the overlap module further comprises:
a calculation sub-module programmed to calculate a first overlap value based, at least in part, upon the identity, quantity, area-of-interest values and/or distribution of the overlap pixels as determined by the determining sub-module.

13. The system of claim 12 wherein:
the data storage device stores a search engine module comprising machine readable instructions and associated data;
the search engine module is programmed to receive, as searcher input by a searcher through a search engine, a search query including a searcher area of interest; and
the overlap module further comprises a converting sub-module programmed to convert the searcher area of interest into the searcher area-of-interest map.

14. The system of claim 13 wherein:
the search engine module is further programmed to collect a plurality of responsive website data sets that: (i) includes the first website data set, and (ii) are responsive to the search query; and
the search engine module is further programmed to prioritize the plurality of responsive website data sets, with the prioritization being based, at least in part, upon the first overlap value determined by the overlap module.

15. The system of claim 14 wherein:
the search engine module is further programmed to return to the searcher, in priority order, a hit list including a plurality of search result returns so that: (i) each search result return identifies and links to one of the responsive web site data sets of the plurality of responsive website data sets, and (ii) the hit list includes a search result return corresponding to the first website data set.

16. A search engine software, stored on a software storage device that stores data in a form more persistent than a signal in transit, the search engine software comprising an overlap module that comprises:
a receiving sub-module; and
a determining sub-module;
wherein:
the receiving sub-module is programmed to receive: (i) a first website area-of-interest map, associated with a first website data set, the first website area-of-interest map being made up of geographic pixels respectively assigned with area-of-interest values, and (ii) a searcher area-of-interest map, based upon a searcher area of interest defined by a searcher, the searcher area-of-interest map being made up of geographic pixels respectively assigned with area-of-interest values; and
the determining sub-module is programmed to determine and overlap area by comparing, on a pixel-by-pixel basis, corresponding pixels of the searcher area-of-interest map and the first website area-of-interest map to determine overlap pixels where the following conditions hold: (i) the first website area-of-interest map has a non-zero interest value, and (ii) the searcher area-of-interest map has a non-zero interest value.

17. The software of claim 16 wherein the overlap module further comprises a converting sub-module programmed to convert a first website area of interest into the first website area-of-interest map.

18. The software of claim 17 wherein the first website area of interest is represented in an XML format.

19. The software of claim 16 wherein the overlap module further comprises:
- a calculation sub-module programmed to calculate a first overlap value based, at least in part, upon the identity, quantity, area-of-interest values and/or distribution of the overlap pixels as determined by the determining sub-module.

20. The software of claim 19 wherein:
- the data storage device stores a search engine module comprising machine readable instructions and associated data;
- the search engine module is programmed to receive, as searcher input by a searcher through a search engine, a search query including a searcher area of interest;
- the overlap module further comprises a converting sub-module programmed to convert the searcher area of interest into the searcher area-of-interest map;
- the search engine module is further programmed to collect a plurality of responsive website data sets that: (i) includes the first website data set, and (ii) are responsive to the search query;
- the search engine module is further programmed to prioritize the plurality of responsive website data sets, with the prioritization being based, at least in part, upon the first overlap value determined by the overlap module; and
- the search engine module is further programmed to return to the searcher, in priority order, a hit list including a plurality of search result returns so that: (i) each search result return identifies and links to one of the responsive web site data sets of the plurality of responsive website data sets, and (ii) the hit list includes a search result return corresponding to the first website data set.

* * * * *